2,994,616
CLAY PROCESSING

Ben W. Rowland, Elizabeth, N.J., assignor to Georgia Kaolin Company, Elizabeth, N.J., a corporation of New Jersey
No Drawing. Filed Mar. 31, 1958, Ser. No. 724,854
17 Claims. (Cl. 106—308)

This invention relates to clay processing and particularly to methods of treating clay to reduce its aqueous viscosity.

Clays are widely used in many industrial applications as fillers, coatings and the like. In these applications, viscosity is an important factor and is determinative of whether a clay may or may not be used for a particular purpose or in a particular process. Large bodies of naturally occurring clay are not suitable for commercial purposes simply because of undesirable viscosity properties. As a result, it is necessary in mining clays to by-pass or reject those portions of the clay whose native viscosity is within these recognized undesirable levels.

I have found that the high viscosity of clay may be materially reduced by a simple and inexpensive process. I have found certain method steps which will, when practiced on high viscosity clays, reduce the viscosity to practical and usable levels.

The practice of my invention will perhaps be best understood by reference to the following examples illustrating certain preferred practices of my invention.

Example I

A Georgia secondary clay was dispersed in water with the usual amount of dispersing polyphosphate (0.3% by weight of sodium hexametaphosphate) until a clay solid of about 40% was reached. The resulting slip had a pH of about 5. About 1% by weight of guanidine carbonate on the dry clay weight basis was then added to the slip. The slip was stirred until the guanidine carbonate was dissolved and uniformly distributed throughout the slip. Alum was then added to the slurry to floc the clay, and the clay filtered. The filtered clay was dried at 100° C. The viscosity of the original untreated slurry was 108,800 at 51.7% solids. The viscosity of the treated slurry was 45,000 at 63% solids. All viscosity measurements were made on the Brookfield viscometer at 10 r.p.m.

Example II

The same clay treated in the same manner but with 2% guanidine carbonate added gave a viscosity on the treated clay of 15,200 at 69% solids.

Example III

Another high viscosity Georgia clay having a Brookfield viscosity of 200,000 at 60% solids in the untreated state was treated in the manner of Example I, with 1% guanidine carbonate. The resulting clay after treatment with 1% guanidine carbonate had a viscosity of 1,000 at 60% solids.

Example IV

A Georgia clay having a Brookfield viscosity of 7,600 at 70.5% solids was treated in the manner of Example I using 1% guanidine carbonate. The treated clay had a viscosity of 1,440 at 71% solids.

Example V

Another medium viscosity Georgia clay having an untreated viscosity in the unbleached condition of 1,400 at 71% solids was treated in the manner set out in Example I with 1% guanidine carbonate. In addition, the clay was bleached with four pounds of sulphur dioxide per ton as sodium hydrosulphite and sulphuric acid to a pH of 3.5. The clay was filtered and rinsed with mannogalactan. The viscosity of the clay after treatment with 1% guanidine carbonate and the bleaching treatment outlined was 500 at 71% solids.

Example VI

A mixture of 25% of very high viscosity clay and 75% low viscosity clay was prepared. The mixture had an untreated viscosity of 5,600 at 68.6% solids. When treated with 1% guanidine carbonate in the fashion set out in Example I the clay mixture had a viscosity of 600 at 71% solids.

Example VII

A very low viscosity Georgia clay having an untreated viscosity of 240 at 71.2% solids was treated with 1% guanidine carbonate in the fashion set out in Example I. The clay so treated had a viscosity of 120 at 70.9% solids.

It will be observed from the foregoing examples that only on extremely high viscosity clays have I used more than 1% guanidine carbonate. I have found that in the medium high viscosity clays I can usually accomplish my result by adding 1% guanidine carbonate although I have found that the viscosity can be lowered still more by increasing the amount of guanidine up to about 3%. There does not seem to be any additional worthwhile results above this level. However, additional amounts do not detract from the improvement imparted by the first additions.

It is apparent from the foregoing examples that guanidine carbonate is compatible with bleaching. I have found that it leaves no odor or discoloration on the clay. I have made coating compositions with starch as the binder in the guanidine-treated clays and coatings have been applied to paper in the usual manner. No objectionable features of the clay due to the treatment have been found. On the contrary, I find that the high viscosity clays thus made useful appear to possess other inherent virtues that may be valuable.

I have found that clays which owe their viscosity to dilatancy do not respond to my treatment. In line with this, I have found that English clays which are naturally dilatant do not respond. My treatment, accordingly, must be limited to non-dilatant clays.

In the foregoing examples guanidine carbonate was used, similar results have been had with the use of guanidine chloride, guanidine nitrate and other salts of guanidine may be used with equal success. Preferably the guanidine salts are used in amounts between about 0.25% to 3%.

While I have illustrated and described certain preferred practices of my invention, it will be understood that the invention may be otherwise embodied within the scope of the following claims.

I claim:

1. In a method of treating non-dilatant clay to reduce its aqueous viscosity comprising the steps of dispersing the clay to be treated in an aqueous vehicle, adding to the dispersed clay at least about 0.25% of a salt of guanidine, permitting the mixture to stand with the guanidine salt in contact with the clay until thorough dispersion has occurred, separating the treated clay from the aqueous vehicle and drying.

2. In a method of treating non-dilatant clay to reduce its aqueous viscosity comprising the steps of dispersing the clay to be treated in an aqueous vehicle, adding to the dispersed clay between about 0.25% and 3% of a salt of guanidine, permitting the mixture to stand with the guanidine salt in contact with the clay until substantially complete dispersion has occurred, separating the treated clay from the aqueous vehicle, and drying.

3. In a method of treating non-dilatant clay to reduce its aqueous viscosity comprising the steps of dispersing the clay to be treated in an aqueous vehicle, adding to the dispersed clay at least about 0.25% of a salt of guanidine, permitting the mixture to stand until a substantial adsorption of guanidine salt has occured on the clay, separating the treated clay from the aqueous vehicle and drying.

4. In a method of treating non-dilatant clay to reduce its aqueous viscosity comprising the steps of dispersing the clay to be treated in an aqueous vehicle, adding to the dispersed clay at least about 0.25% of a material selected from the group consisting of guanidine carbonate, guanidine nitrate and guanidine chloride, permitting the mixture to stand with said guanidine material in contact with the clay until substantially complete dispersion has occurred, separating the treated clay from the aqueous vehicle and drying.

5. In a method of treating non-dilatant clay to reduce its aqueous viscosity comprising the steps of dispersing the clay to be treated in an aqueous vehicle, adding to the dispersed clay between about 0.25% and about 3% of a material selected from the group consisting of guanidine carbonate, guanidine nitrate and guanidine chloride, permitting the mixture to stand with said guanidine material in contact with the clay until substantially complete dispersion has occurred, separating the treated clay from the aqueous vehicle, and drying.

6. In a method of treating non-dilatant clay to reduce its aqueous viscosity comprising the steps of dispersing the clay to be treated in an aqueous vehicle, adding to the dispersed clay about 1% of a material selected from the group consisting of guanidine carbonate, guanidine nitrate and guanidine chloride, permitting the mixture to stand with said guanidine material in contact with the clay until substantially complete dispersion has occurred, separating the treated clay from the aqueous vehicle and drying.

7. In a method of treating non-dilatant clay to reduce its aqueous viscosity comprising the steps of dispersing the clay to be treated in an aqueous vehicle, adding at least about 0.25% guanidine carbonate to the dispersed clay, maintaining the suspension until a substantial adsorption of guanidine carbonate has occurred on the clay particles, separating the treated clay from the aqueous vehicle and drying.

8. In a method of treating non-dilatant clay to reduce its aqueous viscosity comprising the steps of dispersing the clay to be treated in an aqueous vehicle, adding between about 0.25% and about 3% of guanidine carbonate to the dispersed clay, maintaining the suspension until a substantial adsorption of guanidine carbonate has occurred on the clay particles, separating the treated clay from the aqueous vehicle and drying.

9. In a method of treating non-dilatant clay to reduce its aqueous viscosity comprising the steps of dispersing the clay to be treated in an aqueous vehicle, adding at least about 0.25% of guanidine chloride to the dispersed clay, maintaining the suspension until a substantial adsorption of guanidine chloride has occurred on the clay particles, separating the treated clay from the aqueous vehicle and drying.

10. In a method of treating non-dilatant clay to reduce its aqueous viscosity comprising the steps of dispersing the clay to be treated in an aqueous vehicle, adding between about 0.25% and about 3% of guanidine chloride to the dispersed clay, maintaining the suspension until a substantial adsorption of guanidine chloride has occurred on the clay particles, separating the treated clay from the aqueous vehicle and drying.

11. In a method of treating non-dilatant clay to reduce its aqueous viscosity comprising the steps of dispersing the clay to be treated in an aqueous vehicle, adding at least about 0.25% guanidine nitrate to the dispersed clay, maintaining the suspension until a substantial adsorption of guanidine nitrate has occurred on the clay particles, separating the treated clay from the aqueous vehicle and drying.

12. In a method of treating non-dilatant clay to reduce its aqueous viscosity comprising the steps of dispersing the clay to be treated in an aqueous vehicle, adding between about 0.25% and about 3% of guanidine nitrate to the dispersed clay, maintaining the suspension until a substantial adsorption of guanidine nitrate has occurred on the clay particles, separating the treated clay from the aqueous vehicle and drying.

13. A clay of reduced viscosity in aqueous solution and suitable for use in paper coating and rubber compounding consisting essentially of clay particles having adsorbed thereon at least about 0.25% of a salt of guanidine.

14. A clay of reduced aqueous slip viscosity consisting essentially of clay particles having adsorbed thereon at least about 0.25% of a salt of guanidine selected from the group consisting of guanidine chloride, guanidine nitrate and guanidine carbonate.

15. A clay of reduced aqueous slip viscosity consisting essentially of clay particles having adsorbed thereon at least about 0.25% of guanidine carbonate.

16. A clay of reduced aqueous slip viscosity consisting essentially of clay particles having adsorbed thereon at least about 0.25% guanidine chloride.

17. A clay of reduced aqueous slip viscosity consisting essentially of clay particles having adsorbed thereon at least about 0.25% guanidine nitrate.

References Cited in the file of this patent

UNITED STATES PATENTS

| 1,528,908 | Bleininger | Mar. 10, 1925 |
| 2,159,055 | Sloan et al. | May 23, 1939 |
| 2,337,597 | Hall | Dec. 28, 1943 |
| 2,681,314 | Skinner et al. | June 15, 1954 |

FOREIGN PATENTS

| 421,862 | Great Britain | Jan. 1, 1935 |

OTHER REFERENCES

Schwartz et al.: "Surface Active Agents," 1949, pp. 164–165.

Condensed Chemical Dictionary, fourth edition, 1950, page 329.

Feiser and Feiser: "Organic Chemistry," 3d ed. pub. 1956 by Reinhold of N.Y.C. (pages 452–3).